(12) United States Patent
Stone

(10) Patent No.: US 10,717,225 B2
(45) Date of Patent: Jul. 21, 2020

(54) DRAPE FORMING END EFFECTOR

(71) Applicant: The Boeing Company, Chicago, IL (US)

(72) Inventor: Paul R. Stone, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 182 days.

(21) Appl. No.: 15/697,894

(22) Filed: Sep. 7, 2017

(65) Prior Publication Data

US 2019/0070772 A1 Mar. 7, 2019

(51) Int. Cl.
| | |
|---|---|
| *B29C 53/04* | (2006.01) |
| *B29C 70/38* | (2006.01) |
| *B29C 70/54* | (2006.01) |
| *B29C 70/44* | (2006.01) |
| *B29C 70/46* | (2006.01) |
| *B29C 70/34* | (2006.01) |
| *B25J 15/06* | (2006.01) |
| *B25J 15/00* | (2006.01) |
| *B29C 70/40* | (2006.01) |

(52) U.S. Cl.
CPC ............ *B29C 53/043* (2013.01); *B29C 70/38* (2013.01); *B29C 70/44* (2013.01); *B29C 70/46* (2013.01); *B29C 70/541* (2013.01); *B25J 15/0019* (2013.01); *B25J 15/0616* (2013.01); *B29C 70/34* (2013.01); *B29C 70/40* (2013.01)

(58) Field of Classification Search
CPC ....... B29C 53/043; B29C 70/34; B29C 70/38; B29C 70/40; B29C 70/541; B25J 15/0019; B25J 15/0616
See application file for complete search history.

(56) References Cited

U.S. PATENT DOCUMENTS

| | | | |
|---|---|---|---|
| 4,909,880 A | 3/1990 | Kittelson et al. | |
| 5,395,475 A * | 3/1995 | Ozawa | B29C 53/8016 156/117 |
| 5,700,347 A * | 12/1997 | McCowin | B29C 70/388 156/425 |
| 8,454,788 B2 * | 6/2013 | Kisch | B29C 70/388 156/250 |
| 9,211,679 B1 * | 12/2015 | Metschan | B29C 70/30 |
| 2011/0014429 A1 | 1/2011 | Hogg | |
| 2016/0031166 A1 * | 2/2016 | DesJardien | B29C 70/30 264/320 |
| 2016/0311178 A1 * | 10/2016 | Cole | B29C 53/043 |

* cited by examiner

*Primary Examiner* — James P Mackey
(74) *Attorney, Agent, or Firm* — Yee & Associates, P.C.

(57) ABSTRACT

A method for placing a piece of a composite material. The piece of the composite material is picked up from a source using an end effector. The piece is moved to a tool using the end effector. The piece is placed on the tool using the end effector. The piece is conformed to a shape of the tool using a roller system in the end effector, in which the roller system is moveable to conform the piece to a shape of the tool.

32 Claims, 15 Drawing Sheets

DRAPE FORMING END EFFECTOR

BACKGROUND INFORMATION

1. Field

The present disclosure relates generally to manufacturing composite parts and, in particular, to a method and apparatus for laying up composite materials on a tool in a process for manufacturing composite parts.

2. Background

In manufacturing composite structures, layers of composite material may be laid up on a tool. The layers of composite material may be comprised of fibers in sheets. These sheets may take the form of, for example, without limitation, fabrics, tape, tows, or other suitable configurations for the sheets. In some cases, resin may be infused or pre-impregnated into the sheets. These types of sheets are commonly referred to as prepreg. The layers of composite material form a multilayer material. The multilayer material may be shaped and cured to form a composite structure.

In forming composite structures, challenges are present to form these structures with a desired level of speed and quality to meet production requirements. For example, frames for composite stringers are currently laid up by hand. A human operator lays graphite tape over a mandrel as part of forming the frame for a composite stringer. This process is less efficient than desired and relies on the skill of the human operator.

Therefore, it would be desirable to have a method and apparatus that take into account at least some of the issues discussed above, as well as other possible issues. For example, it would be desirable to have a method and apparatus that overcome a technical problem with laying up layers of a composite material to form a multilayer material.

SUMMARY

An embodiment of the present disclosure provides an end effector. The end effector comprises flexible flanges, a vacuum system, and a roller system. The vacuum system holds a piece of a composite material during operation of the vacuum system against the flexible flanges. The roller system is moveable to conform to a shape of a tool such that the roller system bends the flexible flanges to substantially conform to the shape of the tool when the roller system moves over the tool. The roller system enables placing the piece on the tool and compacting the piece on the tool.

Another embodiment of the present disclosure provides a method for placing a piece of a composite material. The piece of the composite material is picked up from a source using an end effector. The piece is moved to a tool using the end effector. The piece is placed on the tool using the end effector. The piece is conformed to a shape of the tool using a roller system in the end effector, in which the roller system is moveable to conform the piece to a shape of the tool.

Yet another embodiment of the present disclosure provides an end effector for placing a piece of a composite material. The end effector comprises a shaft, a channel extending through the shaft, a roller system, and a vacuum system. The roller system comprises a first roller and a second roller connected to a first linkage and a second linkage and an air cylinder. The air cylinder is moveably connected to the shaft. The first linkage and the second linkage are connected to the air cylinder and are moveable by the air cylinder along the shaft. A gap is present between the first roller and the second roller. The gap is adjustable to receive a tool when the first roller and the second roller engage the tool. The vacuum system comprises a vacuum chuck connected to an end of the shaft and a vacuum mat connected to the vacuum chuck. The vacuum mat is flexible, connected to the vacuum chuck, and has an engagement surface with vacuum holes in the engagement surface that are in communication with the channel in the shaft through the vacuum chuck. The vacuum mat is flexible and bends to conform to a shape of the tool when the engagement surface holding the piece of the composite material engages the tool. The first roller and the second roller engage the vacuum mat and the tool.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that using human operators with different levels of skill may result in inconsistent production rates, undesired amounts of rework, or undesired discarding of out-of-tolerance composite structures. Further, the illustrative embodiments recognize and take into account that the manual layup of composite charges is labor extensive. The illustrative embodiments recognize and take into account that laying up one or more pieces of a multilayer material on a tool may be performed more efficiently using a piece of equipment such as a robot. The illustrative embodiments recognize and take into account that with the use of automated equipment, issues with error-prone and skill differences between human operators become moot.

Thus, the illustrative embodiments provide a method, apparatus, and system for placing a piece of a multilayer material on a tool. In one illustrative example, the piece of the multilayer material is moved to the tool using an end effector having flexible flanges and a vacuum system that holds a piece of the multilayer material in a position against the flexible flanges. The piece of the multilayer material is placed onto the tool using a roller system that is moveable to conform to a shape of the tool such that the roller system bends the flexible flanges with the piece of the multilayer material to substantially conform to the shape of the tool when the roller system moves over the tool. The flexible flanges bend to substantially conform to the shape of the tool when the roller system moves over the tool in which the piece of the multilayer material conforms to the tool.

Figure 1:
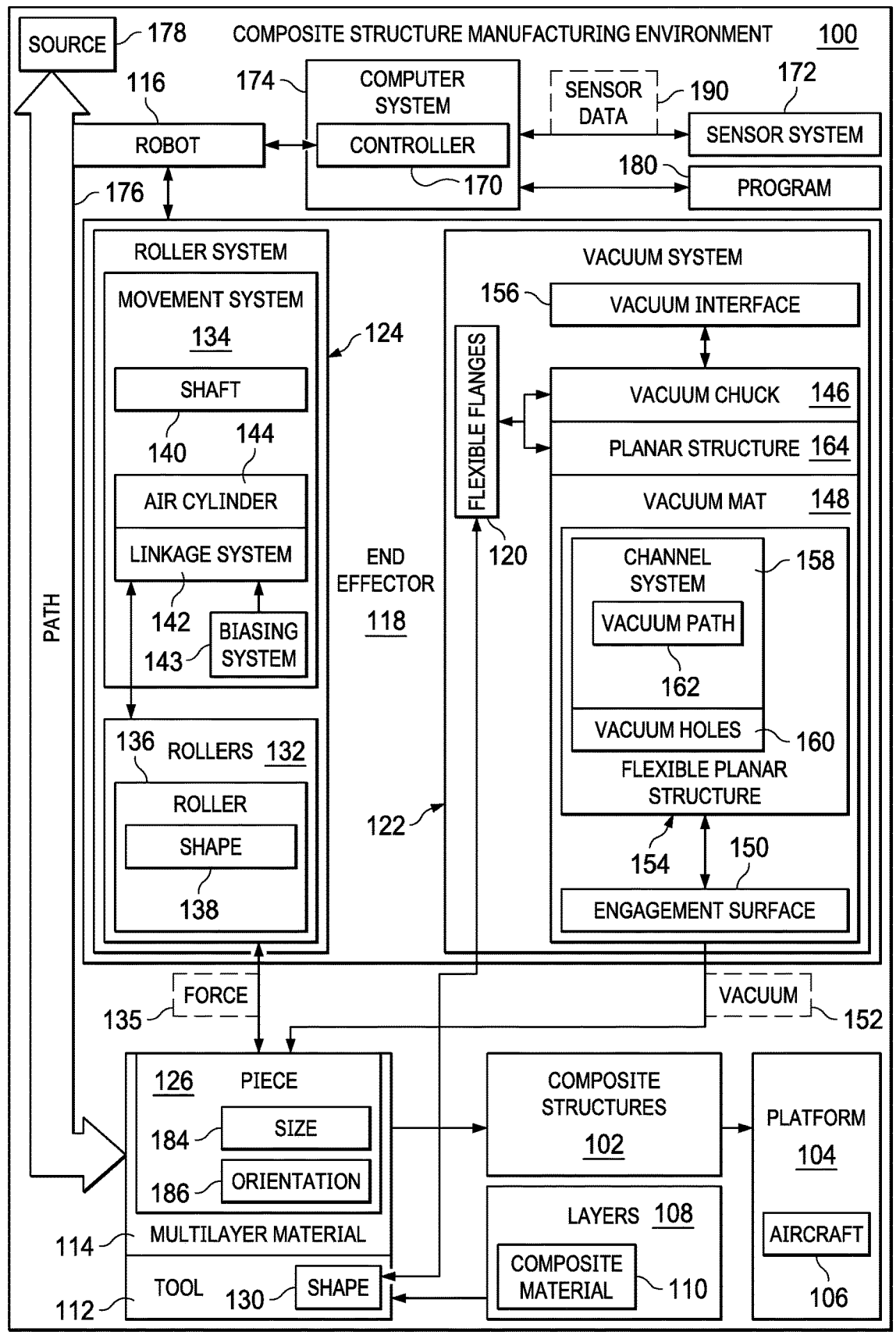
FIG. 1 is an illustration of a block diagram of a composite structure manufacturing environment in accordance with an illustrative embodiment.

With reference now to the figures and, in particular, with reference to FIG. 1, an illustration of a block diagram of a composite structure manufacturing environment is depicted in accordance with an illustrative embodiment. In this illustrative example, composite structure manufacturing environment 100 is an environment in which composite structures 102 may be manufactured for platform 104. In this illustrative example, platform 104 takes the form of aircraft 106. A layer may also be referred to as a piece. In manufacturing of composite structures 102, layers 108 of composite material 110 are laid up on tool 112 to form multilayer material 114. In this illustrative example, tool 112 is selected from a group comprising a mandrel and a mold.

As depicted, composite material 110 is fabricated from two or more materials. Composite material 110, in this depicted example, includes fiber reinforced polymers (FRPs). Fiber reinforced polymers may include carbon fiber reinforced polymer (CFPs), glass fiber reinforced plastic (GRP), or other suitable types of fiber reinforced polymers.

The different layers in layers 108 of composite material 110 may be comprised of different types of composite material and may have different orientations with respect to other layers of layers 108. For example, multilayer material 114 may be selected from at least one of a tape, a graphite tape, a glass fiber tape, a fabric, a prepreg, or some other suitable type of composite material or precursor for forming a composite material.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

As depicted, tool 112 may take a number of different forms. For example, tool 112 may be selected from a group comprising a mandrel, a mold, an inner mold line tool, an outer mold line tool, a table for forming composite charges, or some other suitable type of tool on which layers 108 of composite material 110 may be laid up in manufacturing of composite structures 102.

In this illustrative example, robot 116 operates to form multilayer material 114. Robot 116 is a machine that operates to carry out operations in manufacturing of composite structures 102. Robot 116 may be programmed to perform one or more operations and may be reprogrammable to change the types of operations. In some cases, robot 116 may include artificial intelligence processes.

For example, robot 116 may be used to perform operations including at least one of welding, cutting, installing fasteners, painting, assembling, picking and placing composite materials, inspecting, and other suitable types of operations. Robot 116 may take a number of different forms. For example, robot 116 may be selected from a group comprising a robotic arm, a crawler, a drone, or some other suitable form.

As depicted, robot 116 includes end effector 118. End effector 118 is a device connected to robot 116. In this illustrative example, end effector 118 is removably connected to robot 116. For example, end effector 118 may be located at the end of robot 116 in the form of a robotic arm.

As used herein, a first component "connected to" a second component means that the first component, end effector 118, can be connected directly or indirectly to the second component, robot 116. In other words, additional components may be present between the first component and the second component.

The first component is considered to be indirectly connected to the second component when one or more additional components are present between the two components. When the first component is directly connected to the second component, no additional components are present between the two components.

As depicted, end effector 118 is comprised of a number of different components. In this illustrative example, end effector 118 includes flexible flanges 120, vacuum system 122, and roller system 124.

Flexible flanges 120 used with vacuum system 122 may be used to layup piece 126 of multilayer material 114 on tool 112. In this illustrative example, vacuum system 122 holds piece 126 of multilayer material 114 during operation of vacuum system 122 against flexible flanges 120.

As depicted, roller system 124 is moveable to conform to shape 130 of tool 112 such that roller system 124 bends flexible flanges 120 to substantially conform to shape 130 of tool 112 when roller system 124 moves over tool 112. In this illustrative example, roller system 124 enables placing piece 126 of multilayer material 114 onto tool 112 and compacting multilayer material 114 on tool 112.

As depicted, roller system 124 compacts multilayer material 114 located on tool 112 when roller system 124 moves to conform to shape 130 of tool 112 with multilayer material 114 laid up on tool 112.

In this illustrative example, roller system 124 comprises rollers 132 and movement system 134. As depicted, roller 136 in rollers 132 has shape 138 selected from a group comprising a cylinder, an array of cylinders, a tapered cylinder, a flexible roller, a convex radius cylinder (a cylinder that has a convex radius), a concave radius cylinder (a cylinder with a concave radius), a stack of polymer washers, or some other type of roller.

Further, shape 138 and material of roller 136 may be selected based on the geometry of the part being created. For example, when the sides of tool 112 are substantially flat, a cylindrical shape for roller 136 may be used. Other shapes of tool 112 may result in the selection of other shapes and even other materials. For example, roller 136 may be comprised of a flexible material to conform to the shape of a layup mandrel. Also, a stack of hard rubber rollers may be used for roller 132 in which the outside diameter of each roller and the thickness thereof could be customized.

Movement system 134 is configured to move rollers 132 to conform to shape 130 of tool 112 such that rollers 132 bend flexible flanges 120 to substantially conform to shape 130 of tool 112 when rollers 132 move over tool 112.

As depicted, movement system 134 comprises shaft 140, linkage system 142, biasing system 143, and air cylinder 144. Linkage system 142 is connected to rollers 132. Air cylinder 144 is connected to linkage system 142 and shaft 140. In this example, air cylinder 144 is movably connected to shaft 140. During operation of end effector 118, air cylinder 144 moves in a linear direction along shaft 140 causing rollers 136 to move over tool 112 in such that rollers 136 conform to shape 130 of tool 112.

In this illustrative example, shaft 140 is an elongate structure. Shaft 140 may have various cross-sectional shapes. For example, shaft 140 may have a cross-sectional shape selected from one of a circle, a square, a rectangle, a pentagon, a hexagon, a T-shape, an I-shape, or some other suitable cross-sectional shape. Further, the shape of shaft 140 may change across the length of shaft 140.

In this illustrative example, biasing system 143 may cause rollers 132 to apply force 135 against tool 112 and may aid in rollers 132 conforming to shape 130 of tool 112. Biasing system 143 may take a number of different forms. For example, biasing system 143 may be comprised of at least one of a spring, an air spring, an actuator, a hydraulic piston, an air cylinder connected to a servo-controlled air regulator, or some other suitable device.

In this manner, end effector 118 may drape layers of composite material 110 over tool 112. End effector 118 functions as a drape forming end effector.

In the illustrative example, vacuum system 122 comprises vacuum chuck 146 and vacuum mat 148. Vacuum mat 148 is removably connected to vacuum chuck 146. Vacuum mat 148 has engagement surface 150 that is configured to contact multilayer material 114. As depicted, vacuum 152, applied to vacuum mat 148 through vacuum chuck 146, holds piece 126 of multilayer material 114 in contact with engagement surface 150 of vacuum mat 148.

In the illustrative example, vacuum mat 148 comprises flexible planar structure 154, vacuum interface 156, channel system 158, and vacuum holes 160. As depicted, engagement surface 150 is flexible planar structure 154. Vacuum interface 156 is connectable to vacuum chuck 146. Channel system 158 is located within flexible planar structure 154. Channel system 158 forms vacuum path 162. Vacuum holes 160 are located in engagement surface 150 and are in communication with vacuum chuck 146 through channel system 158 in vacuum mat 148. In the illustrative example, vacuum holes 160 pass through vacuum mat 148 to the side opposite the channels in channel system 158. The side opposite the channels is equipped with a plurality of vacuum cups (not shown).

As depicted, planar structure 164 is connected to vacuum chuck 146 and may be located between vacuum chuck 146 and vacuum mat 148. Flexible flanges 120 are a part of planar structure 164. In another illustrative example, flexible flanges 120 may be separate components connected to vacuum chuck 146, or flexible flanges 120 may be a part of vacuum chuck 146.

In this illustrative example, movement of robot 116 and the control of end effector 118 may be performed using controller 170 and sensor system 172. In the illustrative example, controller 170 and sensor system 172 may be connected to or in communication with robot 116 or may be in a remote location to robot 116. In either case, controller 170 is in communication with robot 116 and sensor system 172. As depicted, sensor system 172 is a physical hardware system that detects information about the environment around robot 116.

As depicted, controller 170 may be implemented in software, hardware, firmware, or a combination thereof. When software is used, the operations performed by controller 170 may be implemented in program code configured to run on hardware, such as a processor unit. When firmware is used, the operations performed by controller 170 may be implemented in program code and data and stored in persistent memory to run on a processor unit. When hardware is employed, the hardware may include circuits that operate to perform the operations in controller 170.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

In the illustrative example, controller 170 may be located in computer system 174. Computer system 174 is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable data processing system.

As depicted, end effector 118 on robot 116 moves on path 176 between source 178 of composite material 110 for piece 126 and tool 112, where multilayer material 114 is being laid up. This movement of end effector 118 may occur with robot 116 moving along path 176. In some illustrative examples, when robot 116 is an arm, robot 116 moves end effector 118. Source 178 of composite material 110 may take a number of different forms. For example, source 178 of composite material 110 may be an automatic feed and cutting device, a tape dispenser, or some other suitable source.

In this illustrative example, controller 170 controls the movement of end effector 118 along path 176. Path 176 may be defined in program 180. Program 180 may be, for example, a computer numerical control (CNC) program or some other suitable program code that may be used to control the operation of robot 116 and end effector 118.

Path 176 may be a path along which obstacles are unexpected. For example, sensor system 172 may detect obstacles, multilayer material 114 on tool, 112, and other information about composite structure manufacturing environment 100.

In this illustrative example, sensor system 172 may include a number of different sensors used by controller 170 to control robot 116 to pick up piece 126, traverse path 176, and place piece 126 on multilayer material 114 laid up on tool 112. For example, sensor system 172 may include at least one of a camera, an ultrasonic sensor, a vacuum gage, a force sensing device, a load cell, or other suitable sensors. Sensor system 172 forms a feedback loop back to controller 170 providing sensor data 190 that is used by controller 170 to control movement of at least one of robot 116 or end effector 118. For example, a vacuum gage in sensor system 172 may be used to determine if end effector 118 has picked up piece 126 from source 178 of composite material 110.

In another illustrative example, sensor system 172 may be utilized to detect engagement between engagement surface 150 and multilayer material 114 laid up on tool 112.

In this manner, controller 170 may control robot 116 in laying up multilayer material 114 on tool 112. For example, controller 170 may be configured to control robot 116 to move end effector 118 to pick up piece 126 from source 178 of composite material 110 using end effector 118, move piece 126 to tool 112 using end effector 118, and place piece 126 on tool 112 such that piece 126 is compacted while stationary on multilayer material 114 laid up on tool 112 using end effector 118. In the illustrative example, the location, shape, and orientation of piece 126 and other pieces of composite material 110 are known prior to pick and place operations being performed to pick up piece 126 from source 178 and place piece 126 on tool 112.

Controller 170 controls movement of end effector 118 connected to robot 116 along path 176 using at least one of program 180 or sensor system 172. In this manner, sensor system 172 detects piece 126 when piece 126 is present at source 178 of composite material 110, and controller 170 controls movement of end effector 118 along path 176 to pick up piece 126, move piece 126 along path 176 to tool 112, and place piece 126 on tool 112 using sensor system 172.

In the illustrative example, size 184 of piece 126 is preselected. As a result, controller 170 knows the size of piece 126 when piece 126 is picked up from source 178. Further, orientation 186 of piece 126 also is known when piece 126 is picked up from source 178. For example, source 178 may be a tape dispenser that dispenses pieces of tape at a known position. The position may include three-dimensional coordinates as well as an orientation of pieces of tape being dispensed. In this manner, orientation 186 of piece 126 may be known to controller 170.

In the event that piece 126 is not in an expected location, a camera in sensor system 172 may be used by controller 170 to finalize the location of piece 126. In this manner, an adjustment is made to path 176 to pick up piece 126 from source 178 if piece 126 is not in an expected location. As another example, orientation 186 of piece 126 may be verified using a camera in sensor system 172. As a result, controller 170 may adjust the manner in which end effector 118 picks up piece 126 in the event that orientation 186 of piece 126 is not at the expected orientation.

With respect to placement, a camera in sensor system 172 may be used to control placement of piece 126 to have a desired edge-to-edge arrangement of multilayer material 114 on tool 112. The camera may be used to ensure that an out-of-tolerance gap between plies placed is absent or that an undesired overlap of plies does not occur along the edges. The control of the placement may also be formed using a laser to detect whether undesired gaps or overlaps occur.

Also in placing piece 126, the orientations are known ahead of time and piece 126 may be placed with a desired orientation. For example, the orientation of layers in multilayer material 114 are known. The desired orientation for piece 126 is also known. In some illustrative examples, the camera in sensor system 172 may be used to verify orientation 186 of a prior layer to piece 126 in multilayer material 114. The camera may verify orientation 186 of the prior layer and place piece 126 with a desired orientation based on orientation 186. prior layer.

In one illustrative example, one or more technical solutions are present that overcome a technical problem with laying up layers of a composite material to form a multilayer material. As a result, one or more technical solutions may provide a technical effect of enabling the laying up of piece 126 of multilayer material 114 onto tool 112 in a manner that conforms piece 126 to shape 130 of tool 112. This process may be performed using end effector 118 in a manner that is more accurate and faster than currently used techniques. As a result, at least one of the amount of rework or discarded parts may be reduced. The illustration of composite structure manufacturing environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although the illustrative examples are described with respect to aircraft 106, another illustrative example may be applied to other types of platforms. Platform 104 may be, for example, a mobile platform, a stationary platform, a land-based structure, an aquatic-based structure, and a space-based structure. More specifically, platform 104 may be a surface ship, a tank, a personnel carrier, a train, a spacecraft, a space station, a satellite, a submarine, an automobile, a power plant, a bridge, a dam, a house, a manufacturing facility, a building, a kitchen sink, and other suitable platforms.

Figure 2:
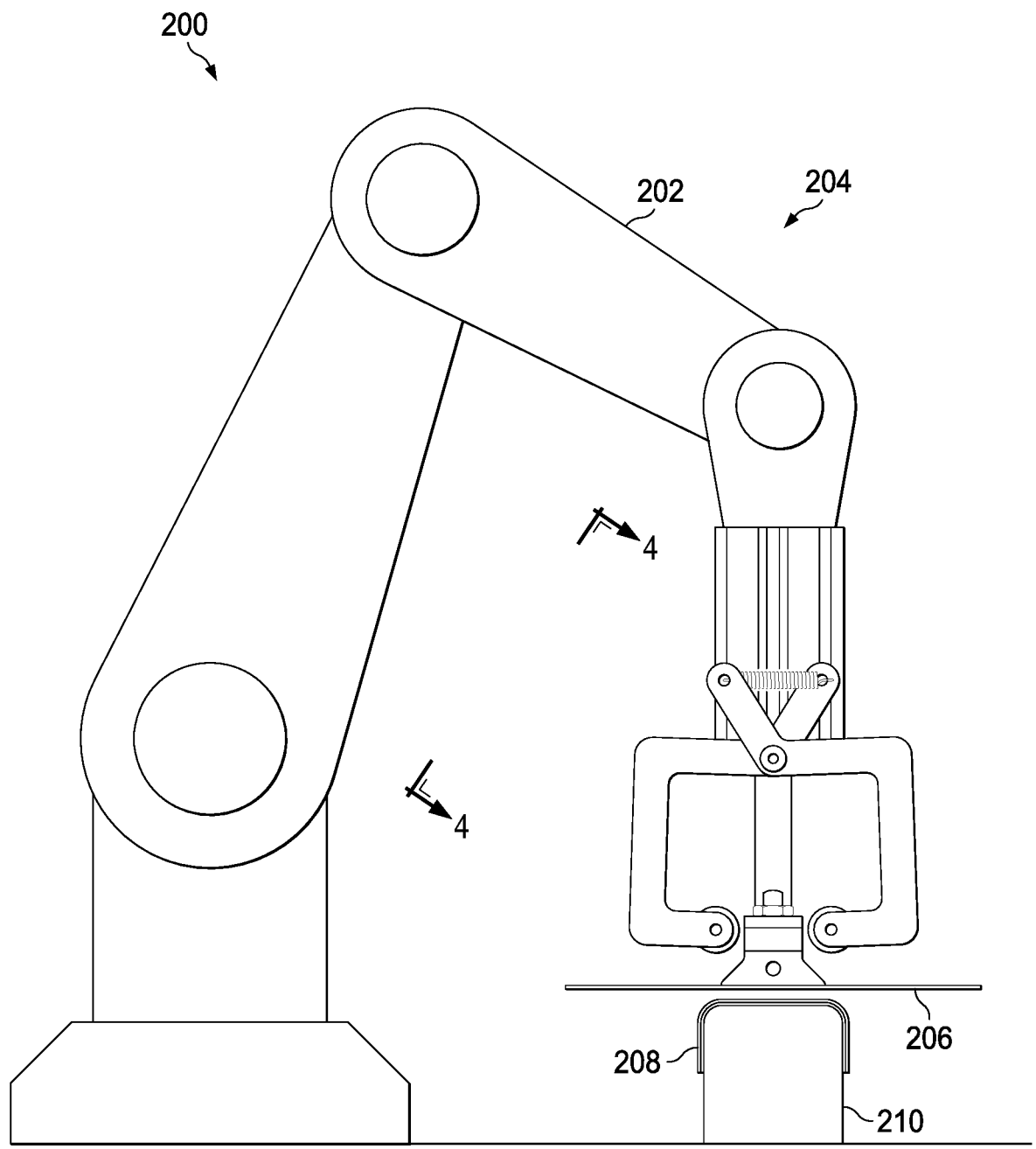
FIG. 2 is an illustration of a composite structure manufacturing environment in accordance with an illustrative embodiment.

With reference now to FIG. 2, an illustration of a composite structure manufacturing environment is depicted in accordance with an illustrative embodiment. Composite structure manufacturing environment 200 is an example of one physical implementation for composite structure manufacturing environment 100 shown in block form in FIG. 1.

As depicted, composite structure manufacturing environment 200 includes robotic arm 202. Robotic arm 202 is an example of one implementation for robot 116 shown in block form in FIG. 1. In this depicted example, end effector 204 is an example of one implementation of end effector 118 shown in block form in FIG. 1. As depicted, tape 206 is picked up by robotic arm 202 for placement on multilayer material 208 on tool 210.

Figure 3:
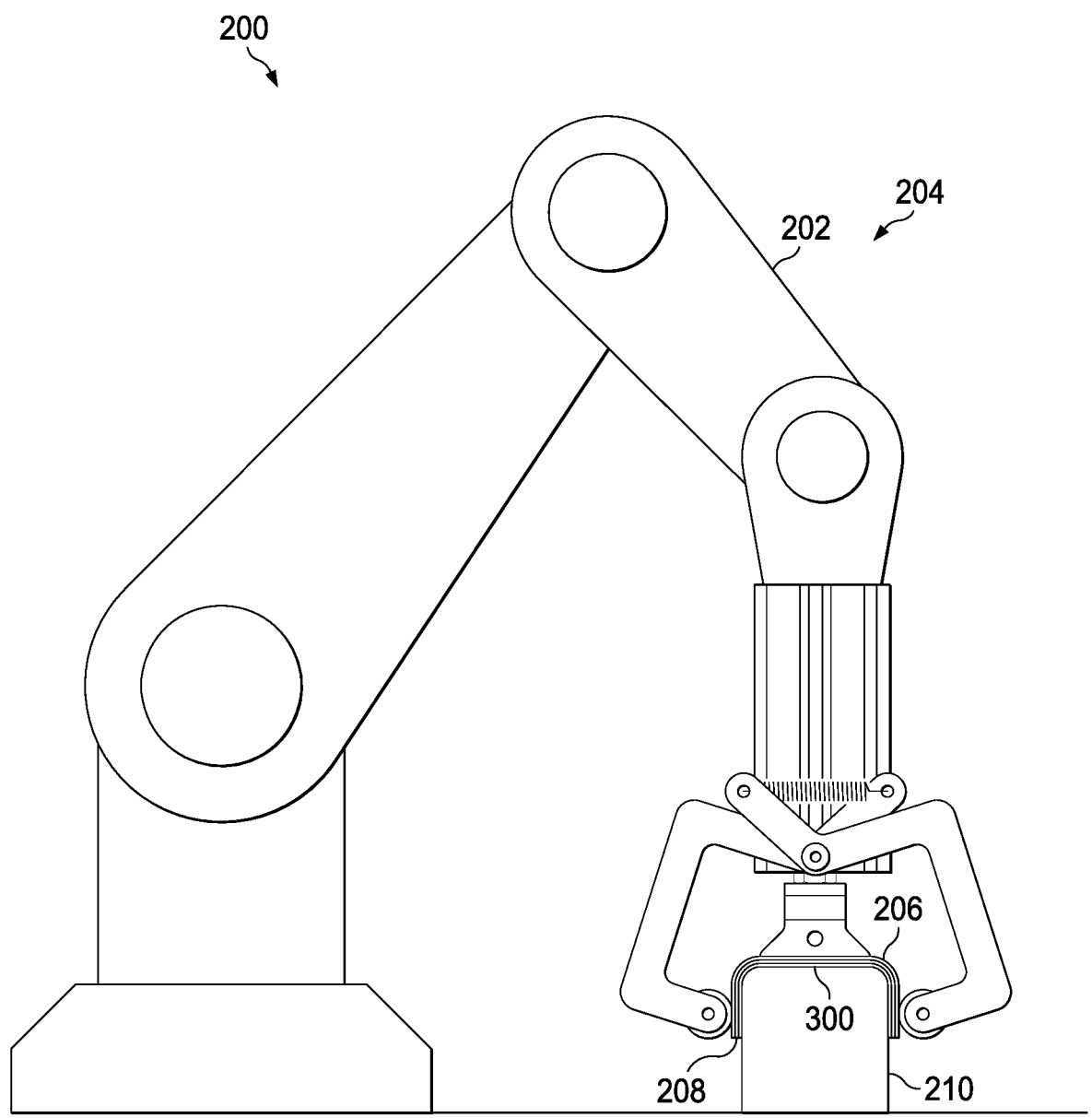
FIG. 3 is an illustration of a composite structure manufacturing environment in accordance with an illustrative embodiment.

Turning next to FIG. 3, an illustration of a composite structure manufacturing environment is depicted in accordance with an illustrative embodiment. In the illustrative examples, the same reference numeral may be used in more than one figure. This reuse of a reference numeral in different figures represents the same element in the different figures.

As depicted, tape 206 has been placed on multilayer material 208. Robotic arm 202 with end effector 204 drapes tape 206 over tool 210. Tape 206 is placed on tool 210 in a manner that tape 206 conforms to the shape of surface 300 of tool 210. Tape 206 also is compacted with other pieces of multilayer material 208.

Figure 4:
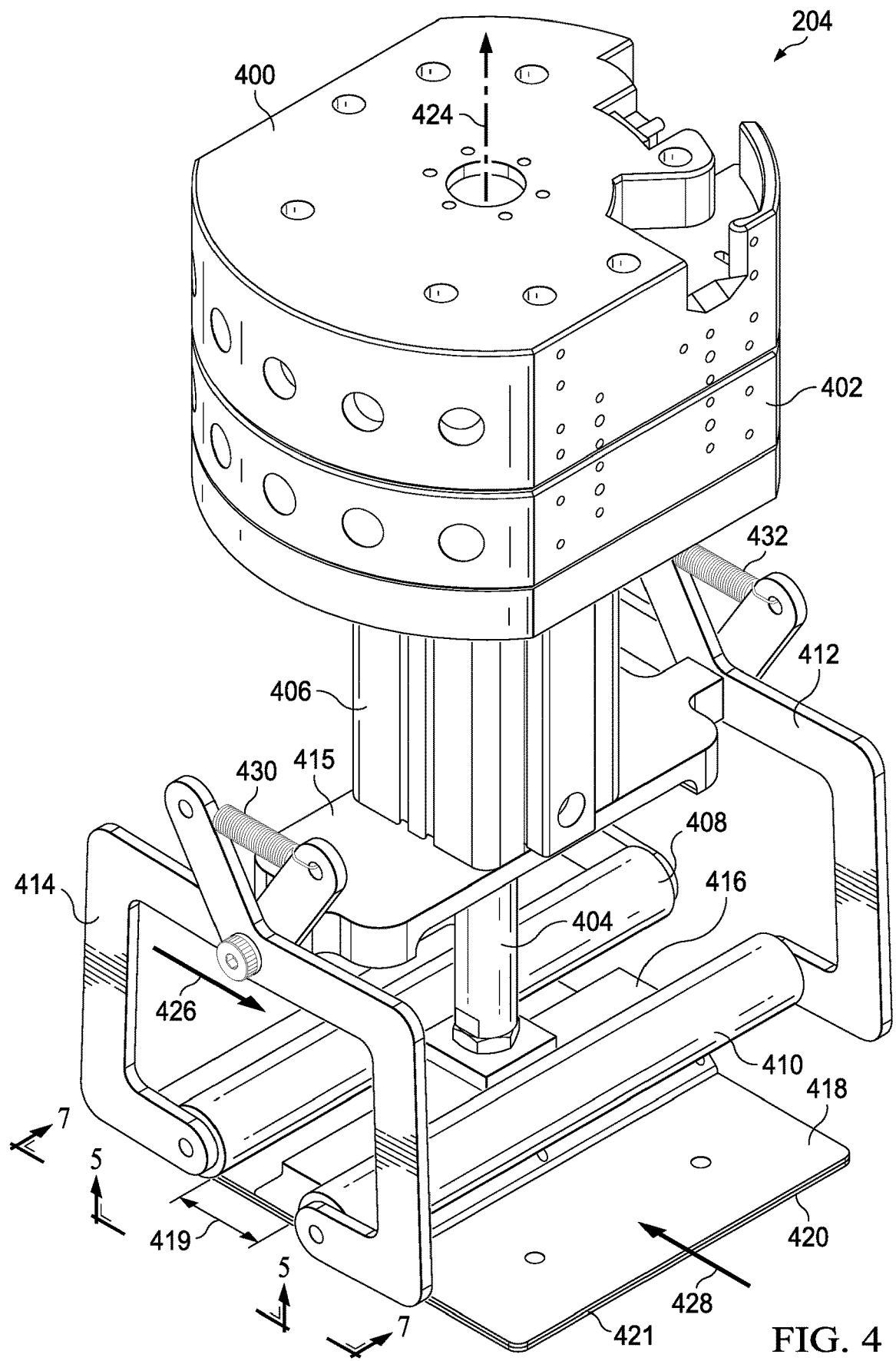
FIG. 4 is an illustration of an end effector in accordance with an illustrative embodiment.

With reference next to FIG. 4, an illustration of an end effector is depicted in accordance with an illustrative embodiment. In this figure, an isometric view of end effector 204 in the direction of lines 4-4 in FIG. 2 is shown.

As depicted in this view, end effector 204 comprises coupler 400, adapter plate 402, shaft 404, air cylinder 406, roller 408, roller 410, linkage 412, linkage 414, vacuum chuck 416, planar structure 418, and vacuum mat 420.

As depicted, coupler 400 and adapter plate 402 are structures used to connect end effector 204 to robotic arm 202 or some other robot. These components may be comprised of a number of different materials. For example, coupler 400 and adapter plate 402 may be comprised of a number of materials selected from at least one of aluminum, a polycarbonate, a plastic, steel, or some other suitable type of material.

In this illustrative example, shaft 404, air cylinder 406, roller 408, roller 410, linkage 412, and linkage 414 are examples of components that may be used to implement roller system 124 shown in block form in FIG. 1. Roller 408 and roller 410 are examples of physical implementations for rollers 132 shown in block form in FIG. 1.

Roller 408 and roller 410 may be comprised of a number of different types of material. For example, these rollers may be comprised of one or more materials selected from at least one of a polycarbonate, a plastic, a rubber, a metal, aluminum, fiber reinforced composites, or some other suitable type of material. Any suitable material may be used for these rollers. For example, a tool with a minimally contoured profile may use a hard substance, such as a metal or hard plastic. A tool with a more highly contoured profile may be used for a hard rubber material, a more flexible or softer rubber, a stack of flexible polymer washers, rubber washers, an inflatable roller, or some other suitable material.

Shaft 404, air cylinder 406, linkage 412, linkage 414, and plate 415 are examples of physical implementations for components in movement system 134 shown in block form in FIG. 1. As depicted, linkage 412, linkage 414, and plate 415 are an example of a physical implementation for linkage system 142 in movement system 134, both shown in block form in FIG. 1. These components may be comprised of a number of different materials. For example, the materials may be selected from at least one of aluminum, a polycarbonate, a plastic, steel, or some other suitable type of material.

Air cylinder 406 is movably connected to shaft 404. Air cylinder 406 may move along axis 424 extending centrally through shaft 404. Air cylinder 406 is also connected to the first linkage, linkage 412, and to the second linkage, linkage 414, in which the first linkage and the second linkage are moveable by air cylinder 406 along shaft 404. Movement of air cylinder 406 in the direction of arrow 428 also causes movement of roller 408 and roller 410 connected to air cylinder 406 through linkage 412, linkage 414, and plate 415.

As depicted, a first roller, roller 408, is connected to a second roller, roller 410, and these rollers are connected to a first linkage, linkage 412, and a second linkage, linkage 414. The first linkage and the second linkage are connected to air cylinder 406 and moveable by the air cylinder 406 along shaft 404. As depicted, gap 419 is present between the first roller and the second roller in which gap 419 is adjustable to receive a tool (not shown) when the first roller and the second roller engage the tool.

In this illustrative example, roller 408 is biased in the direction of arrow 426 and roller 410 is biased in the direction of arrow 428. The biasing is provided by spring 430 on linkage 414 and spring 432 on linkage 412. In other illustrative examples, other types of biasing mechanisms may be used to apply force. For example, an actuator, an air cylinder, or some other suitable biasing mechanism may be used in place of or in addition to spring 430 and spring 432.

In the illustrative example, planar structure 418 is connected to vacuum chuck 416. Vacuum mat 420 is flexible and connected to vacuum chuck 416. Vacuum mat 420 also is connected to planar structure 418. Vacuum mat 420 bends to conform to shape of a tool (not shown) when engagement surface 421, holding a piece of composite material (not shown), engages a tool (not shown) and the rollers, roller 408 and roller 410, engage vacuum mat 420 and the tool.

Vacuum mat 420 may be considered to be indirectly connected to vacuum chuck 416 via planar structure 418. Planar structure 418 and vacuum mat 420 are flexible structures and comprised of a number of flexible materials. For example, these two structures may be selected from at least one of an elastomer, a polyethylene, a vinyl, a polyvinyl, or some other suitable type of material that provides a desired amount of flexibility for planar structure 418 and vacuum mat 420.

Figure 5:
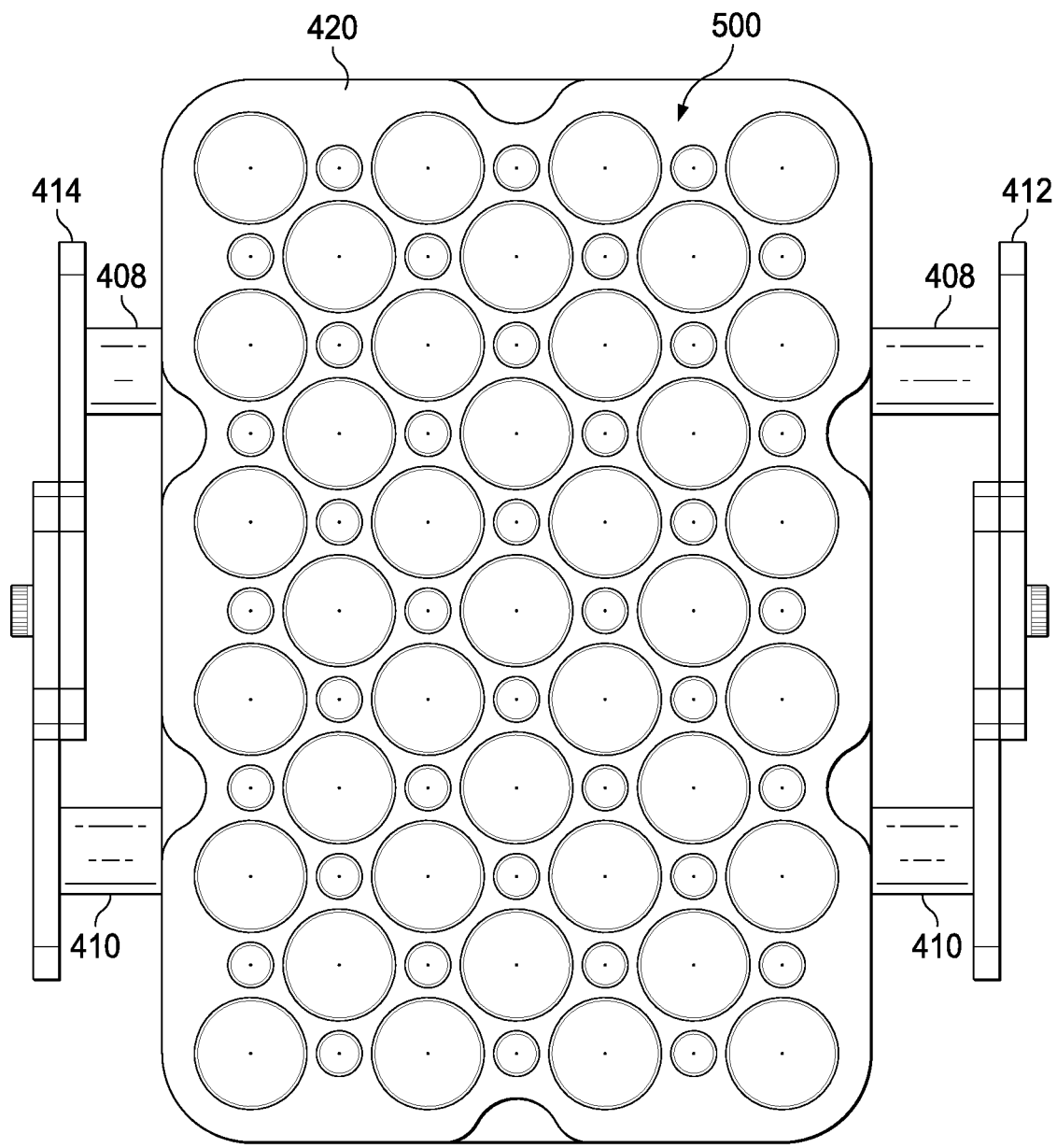
FIG. 5 is an illustration of an end effector in accordance with an illustrative embodiment.

Turning to FIG. 5, another illustration of an end effector is depicted in accordance with an illustrative embodiment. In this figure, a view of end effector 204 is seen in the direction of lines 5-5 in FIG. 4. In this view, vacuum holes 500 are visible.

Figure 6:
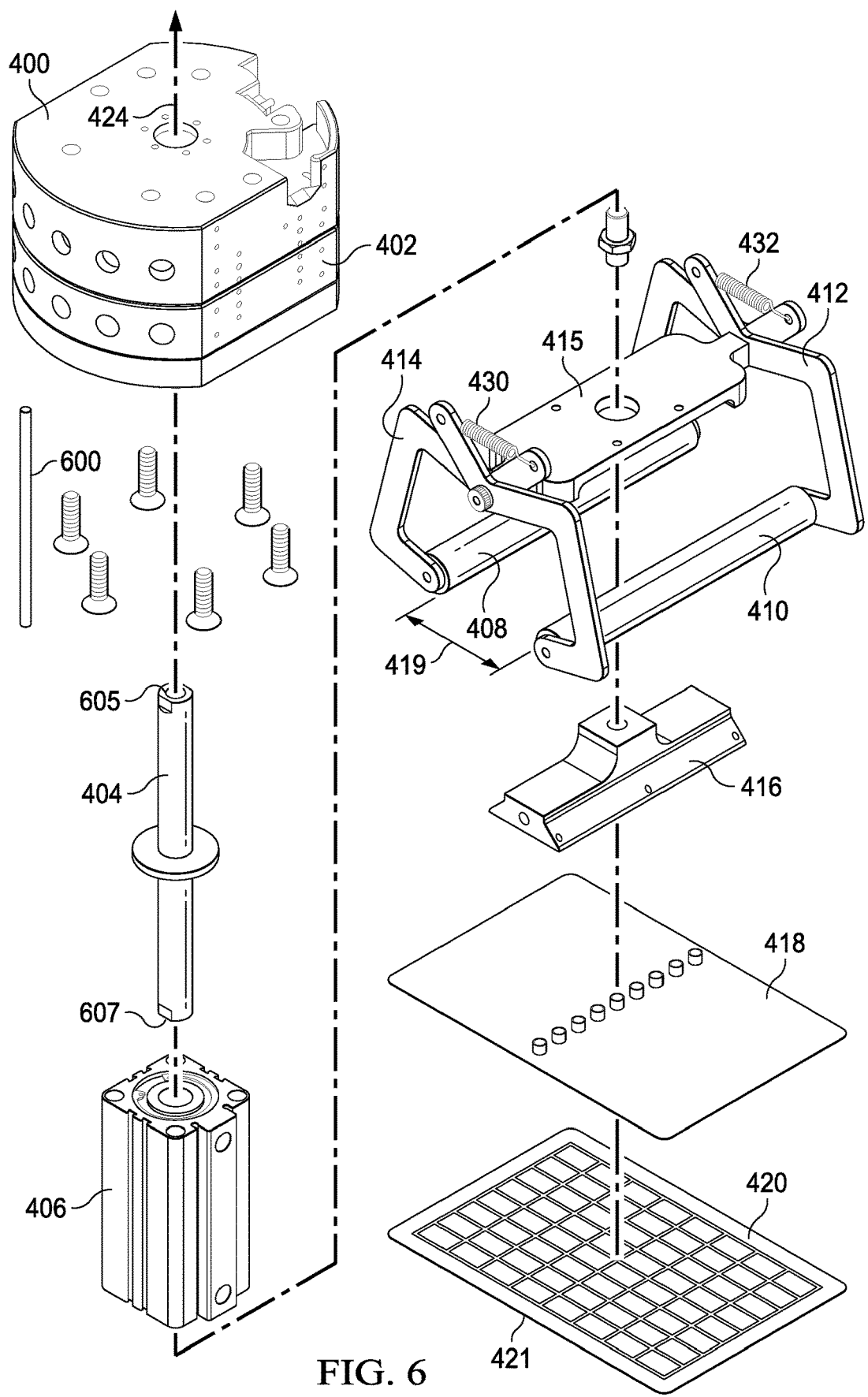
FIG. 6 is an illustration of an exploded view of an end effector in accordance with an illustrative embodiment.

With reference next to FIG. 6, an illustration of an exploded view of an end effector is depicted in accordance with an illustrative embodiment. In this figure, an exploded view of end effector 204 in FIG. 4 is depicted.

In this exploded view, anti-rotation rod 600 is a component that keeps air cylinder 406 from rotating. Shaft 404 is hollow and provides a conduit for applying a vacuum. As depicted, channel 605 extends through shaft 404 along axis 424. Axis 424 extends centrally through shaft 404. Vacuum chuck 416 is connected to end 607 of shaft 404. A vacuum may be applied to vacuum chuck 416 through channel 605 in shaft 404. Channel 605 connects vacuum chuck 416 to a vacuum source. In another illustrative example, a vacuum can be applied using a flexible tube (not shown) that passes through coupler 400 and adapter plate 402 to vacuum chuck 416. The flexible tube (not shown) can be utilized to apply a vacuum to vacuum chuck 416.

Figure 7:
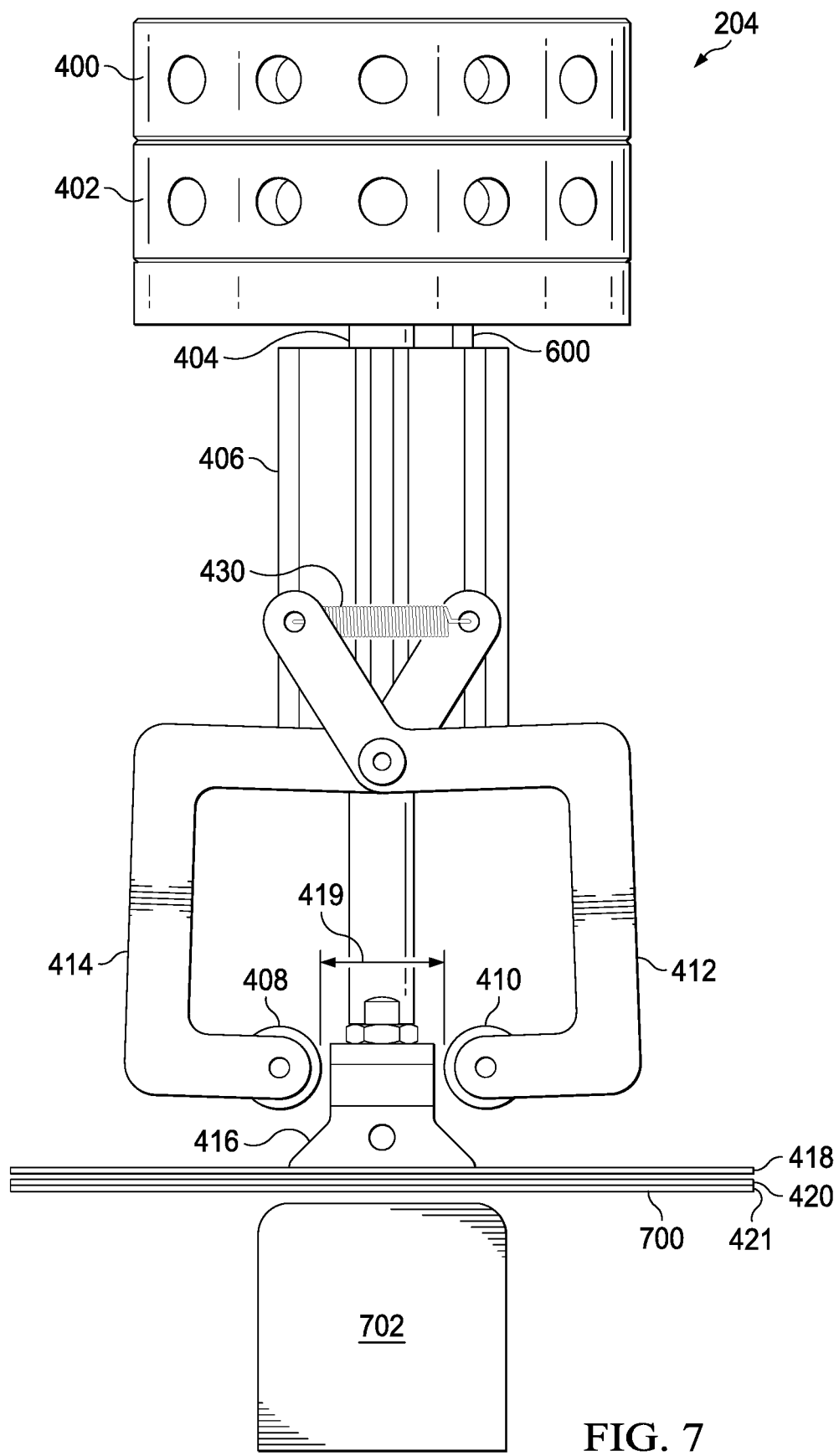
FIG. 7 is an illustration of an end effector in accordance with an illustrative embodiment.

With reference now to FIG. 7, an illustration of end effector is depicted in accordance with an illustrative embodiment. In this figure, a side view of end effector 204 is seen in a direction of lines 7-7 as shown in FIG. 4.

In this view, end effector 204 is shown holding tape 700 in a position over mandrel 702. As depicted, tape 700 is held on end effector 204 through a vacuum applied to vacuum mat 420 through planar structure 418 and vacuum chuck 416. As depicted, tape 700 is positioned to be draped on mandrel 702.

Figure 8:
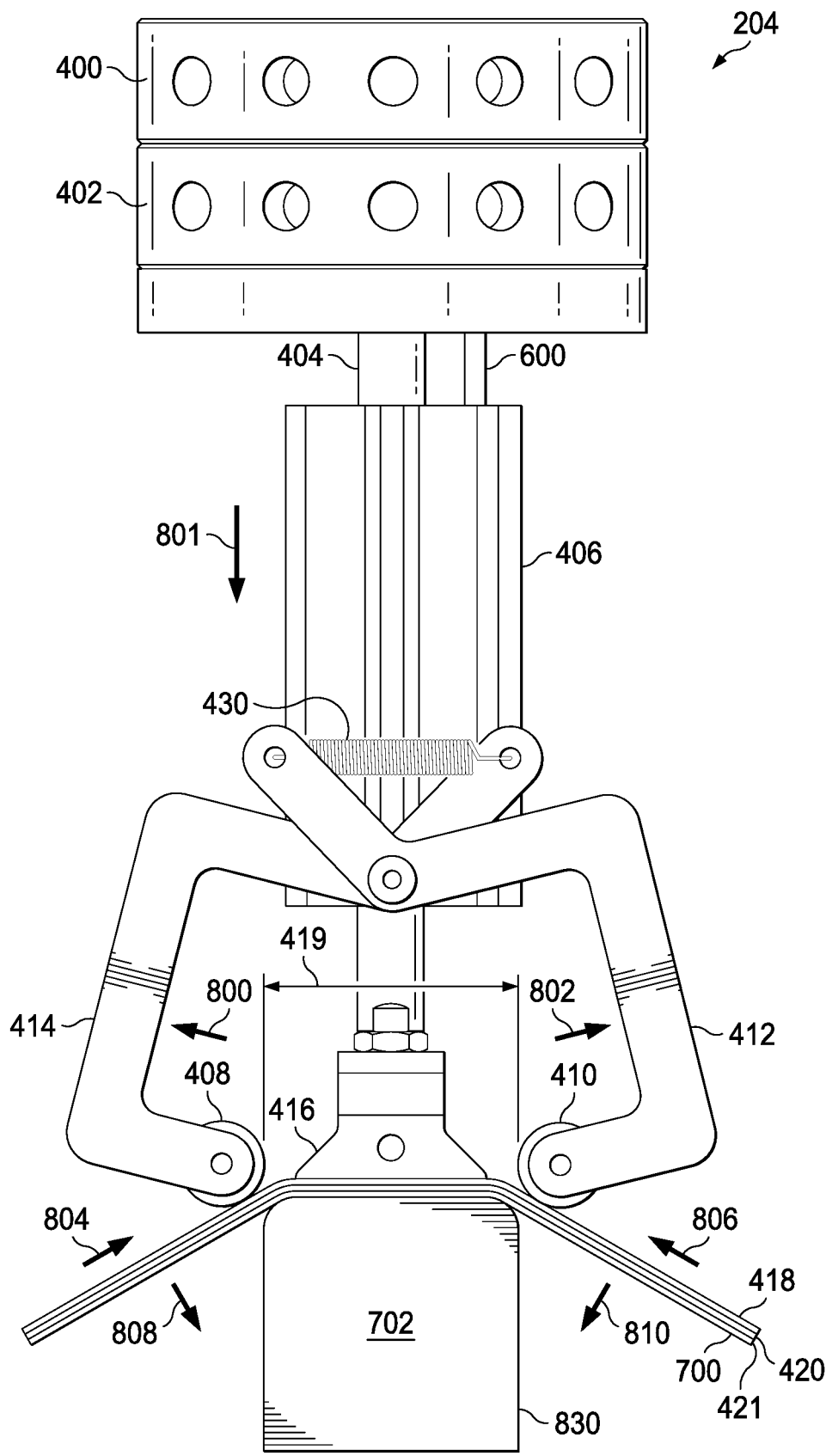
FIG. 8 is an illustration of an end effector draping a tape on a mandrel in accordance with an illustrative embodiment.

With reference next to FIG. 8, an illustration of end effector 204 draping tape 700 on mandrel 702 is depicted in accordance with an illustrative embodiment. In this figure, a side view of end effector 204 is seen in a direction of lines 7-7 as shown in FIG. 4.

As depicted, air cylinder 406 has moved in the direction of arrow 801. With this movement of air cylinder 406, roller 408 has been moved in the direction of arrow 800, and roller 410 has been moved in the direction of arrow 802.

Roller 408 and roller 410 are engaged with mandrel 702. With this engagement, roller 408 applies force in the direction of arrow 804, and roller 410 applies force in the direction of arrow 806. This force is applied using spring 430 and spring 432 (not shown).

Further, planar structure 418 and vacuum mat 420 are bent in the direction of arrow 808 and arrow 810. Tape 700 is held against vacuum mat 420 for placement on mandrel 702 in this illustration.

In the illustrative example, the vacuum may be turned off when tape 700 makes contact with the layup (not shown) and pressure is applied or when tape 700 makes contact with surface 830 of mandrel 702 if the piece of tape 700 being applied is on the first layer. The vacuum may be removed to avoid wrinkling or other inconsistencies.

Figure 9:
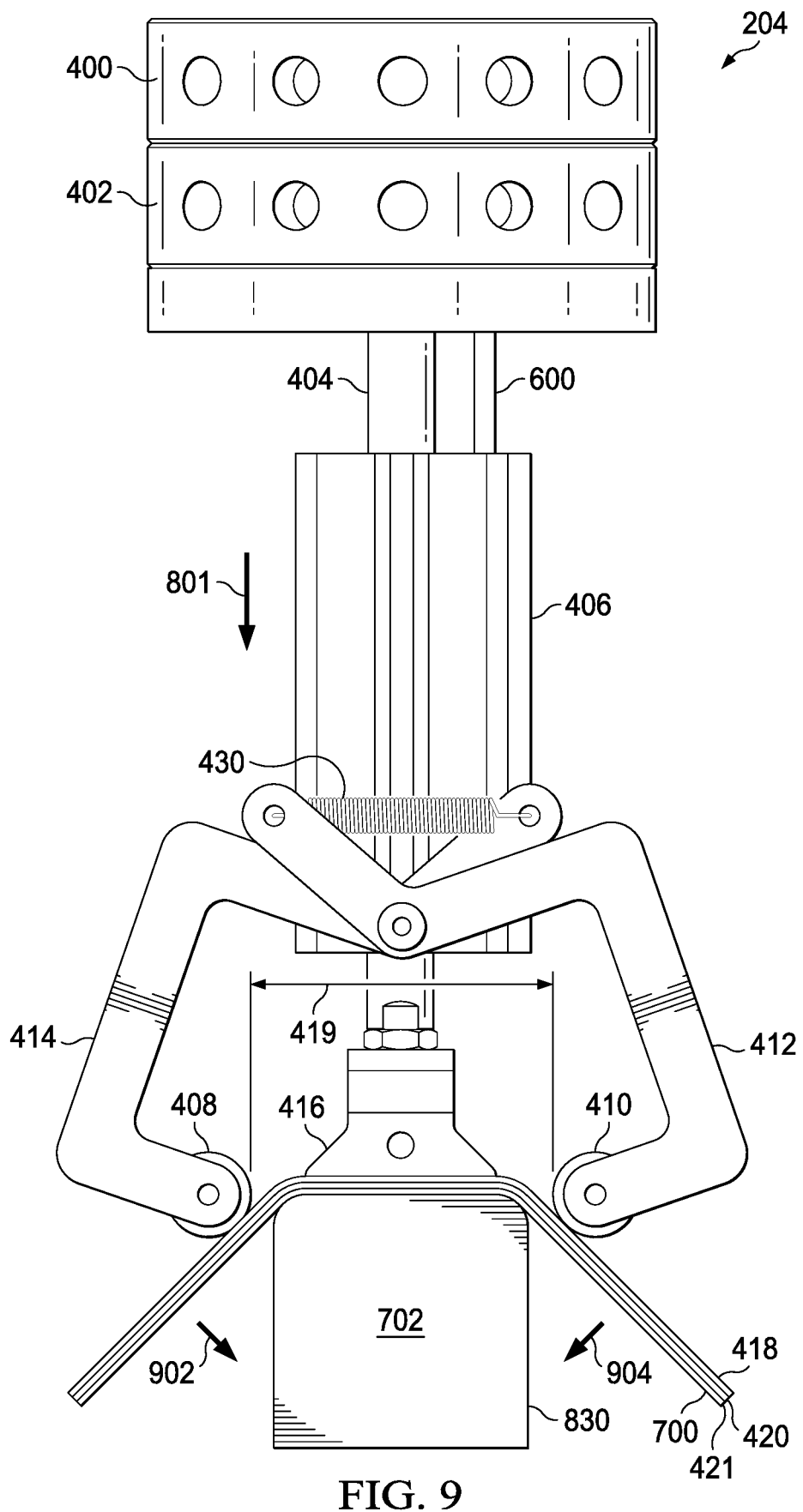
FIG. 9 is an illustration of an end effector draping a tape on a mandrel in accordance with an illustrative embodiment.

With reference next to FIG. 9, an illustration of an end effector draping a tape on a mandrel is depicted in accordance with an illustrative embodiment. In this figure, a side view of end effector 204 is seen in a direction of lines 7-7 as shown in FIG. 4.

In this illustration, air cylinder 406 has moved further in the direction of arrow 801. With this movement, roller 408 and roller 410 have traveled further in the direction of arrow 801 conforming to the shape of surface 830 of mandrel 702.

As can be seen in this illustration, planar structure 418 and vacuum mat 420 are bent further in the direction of arrow 902 and arrow 904 with tape 700 being held against vacuum mat 420.

Figure 10:
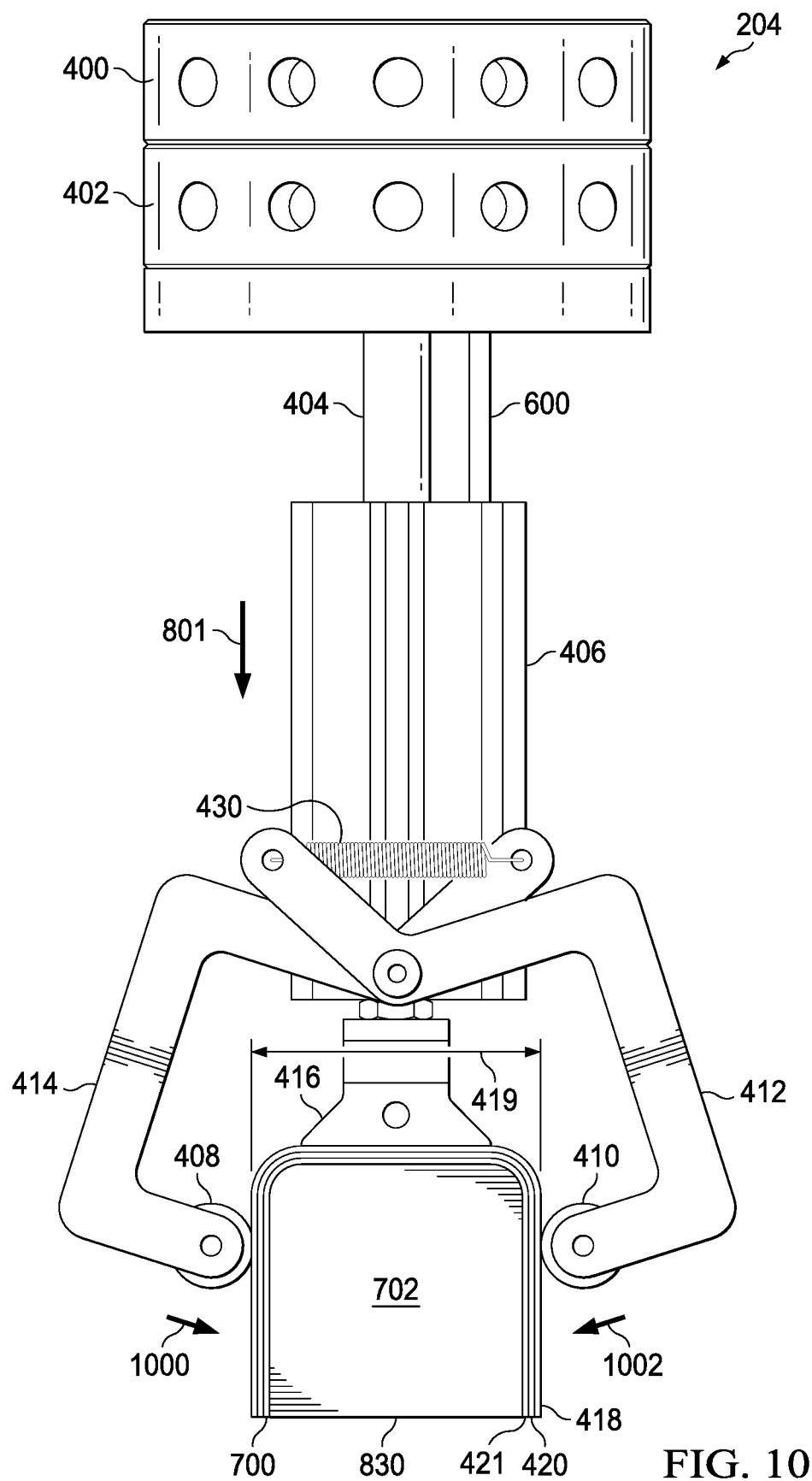
FIG. 10 is an illustration of an end effector draping a tape on a mandrel in accordance with an illustrative embodiment.

With reference next to FIG. 10, an illustration of an end effector draping a tape on a mandrel is depicted in accordance with an illustrative embodiment. In this figure, a side view of end effector 204 is seen in a direction of lines 7-7 as shown in FIG. 4.

As depicted in this figure, air cylinder 406 has traveled further in the direction of arrow 801. In this position, planar structure 418 and vacuum mat 420 are bent such that tape 700 conforms to surface 830 of mandrel 702. In this view, tape 700 has been draped over mandrel 702.

Further, with the biasing of roller 408 in the direction of arrow 1000 and the biasing of roller 410 in the direction of arrow 1002 as these rollers move in the direction of arrow 801, tape 700 is compacted against mandrel 702. This compacting may be used to cause tape 700 to adhere to mandrel 702 or other layers of composite material (not shown) that may be laid up on mandrel 702.

Figure 11:
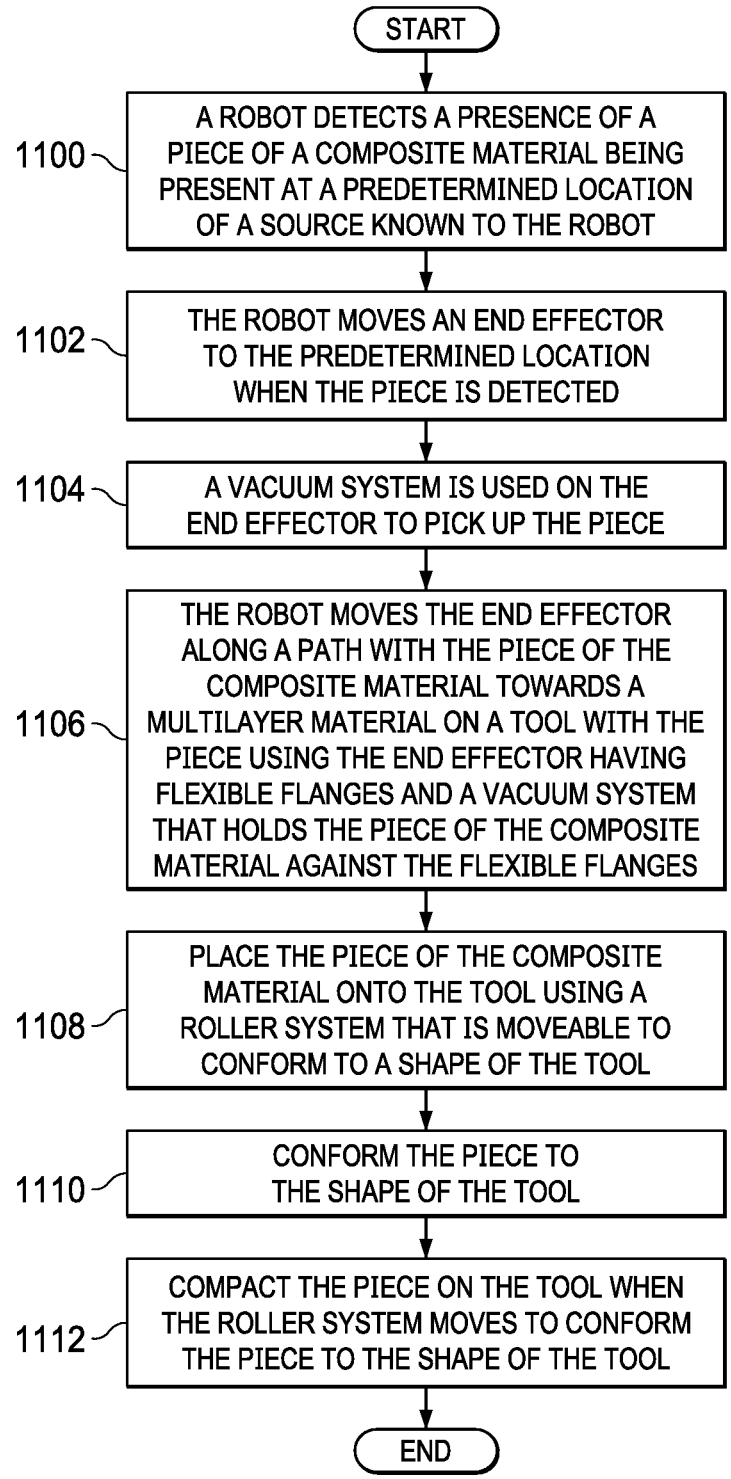
FIG. 11 is an illustration of a flowchart of a process for placing a piece of a multilayer material in accordance with an illustrative embodiment.

Turning next to FIG. 11, an illustration of a flowchart of a process for placing a piece of a multilayer material is depicted in accordance with an illustrative embodiment. The process depicted in this flowchart may be implemented in composite structure manufacturing environment 100 using robot 116 with end effector 118, as shown in block form in FIG. 1.

The process begins with robot 116 detecting a presence of piece 126 of composite material 110 being present at a predetermined location of source 178 known to robot 116 (operation 1100). In operation 1100, an automatic feed and cutting device may present piece 126 at the predetermined location known to robot 116. This predetermined location may be a part of programming for robot 116. The programming may be, for example, a computer numeric control (CNC) program. The detection of the presence of piece 126 may be made a number of ways. For example, robot 116 may include a camera that generates data used to detect if piece 126 is present. In another illustrative example, an automatic feeding and cutting device may send a signal to robot 116 indicating that piece 126 is ready to be picked up at the predetermined location.

Robot 116 moves end effector 118 to the predetermined location when piece 126 is detected (operation 1102). In operation 1102, the movement is along path 176. The process uses vacuum system 122 on end effector 118 to pick up piece 126 (operation 1104). In this example, piece 126 is held against flexible planar structure 154 in vacuum system 122 when vacuum system 122 applies vacuum 152 on piece 126.

Robot 116 moves end effector 118 along path 176 with piece 126 of composite material 110 towards multilayer material 114 on tool 112 with piece 126 using end effector 118 having flexible flanges 120 and vacuum system 122 that holds piece 126 of composite material 110 against flexible flanges 120 (operation 1106). The process places piece 126 of composite material 110 onto tool 112 using roller system 124 that is moveable to conform to shape 130 of tool 112 (operation 1108). The process conforms piece 126 to shape 130 of tool 112 (operation 1110). Operation 1110 may be performed by bending flexible flanges 120 to substantially conform to shape 130 of tool 112 when roller system 124 moves over tool 112 in which piece 126 of multilayer material 114 conforms to tool 112.

The process compacts piece 126 on tool 112 when roller system 124 moves to conform piece 126 to shape 138 of tool 112 (operation 1112). The process terminates thereafter.

Figure 12:
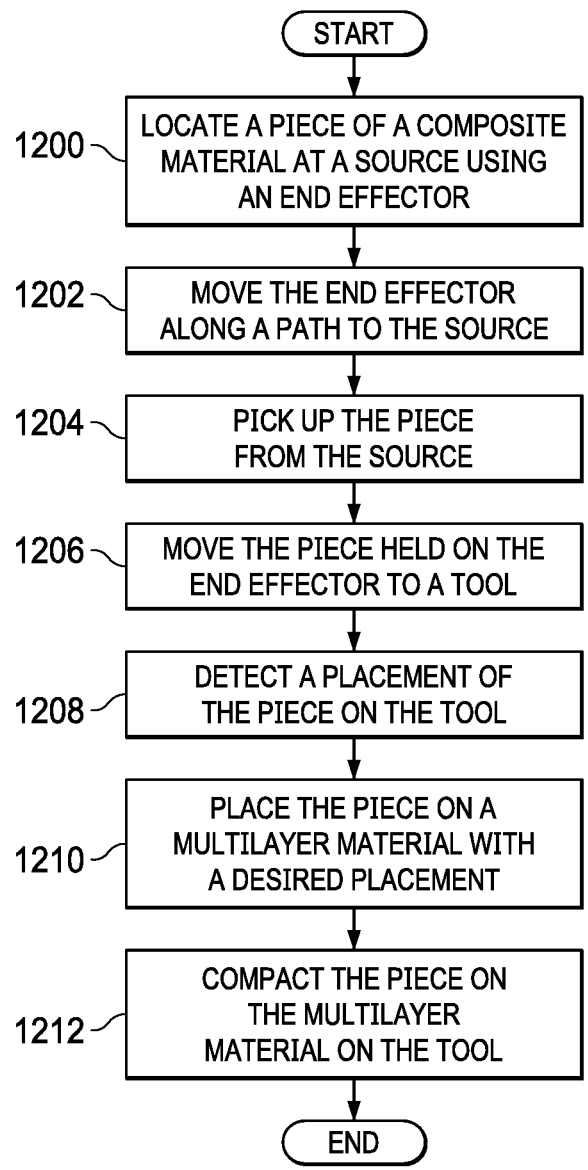
FIG. 12 is an illustration of a flowchart of a process for placing a piece of composite material in accordance with an illustrative embodiment.

With reference next to FIG. 12, an illustration of a flowchart of a process for placing a piece of composite material is depicted in accordance with an illustrative embodiment. The process depicted in this flowchart may be implemented in composite structure manufacturing environment 100 using robot 116 with end effector 118, as shown in block form in FIG. 1.

The process begins by locating piece 126 of composite material 110 at source 178 using end effector 118 (operation 1200). In operation 1200, the process may locate piece 126 by detecting the presence of piece 126 at source 178. This presence may be detected through a signal generated by source 178 or using sensor system 172 for robot 116. The process moves the end effector 118 along path 176 to source 178 (operation 1202). The process picks up piece 126 from source 178 (operation 1204). In operation 1204, piece 126 may be picked up using vacuum 152.

The process moves piece 126 held on end effector 118 to tool 112 (operation 1206). In operation 1206, piece 126 can be moved by end effector 118 on path 176.

The process detects a placement of piece 126 on tool 112 (operation 1208). Other pieces of composite material 110 in multilayer material 114 may already be present on tool 112, or piece 126 may be the first piece to be placed on tool 112. The placement for placing piece 126 may be identified using sensor system 172. The placement may include at least one of an orientation, a location relative to other pieces already placed in multilayer material 114, or other suitable factors.

With respect to the placement of prior placed pieces in multilayer material 114, the placement of these pieces may be identified using sensor system 172 for use in identifying the placement of piece 126. The placement may include at least one of an orientation, a location of pieces in multilayer material 114 relative to each other, or other suitable parameters regarding multilayer material 114 needed to place piece 126 on multilayer material 114.

The process then places piece 126 on multilayer material 114 with a desired placement (operation 1210). The process compacts piece 126 on multilayer material 114 on tool 112 (operation 1212). The process terminates thereafter. The desired placement may include at least one of a desired orientation with respect to other pieces of multilayer material 114, the desired location of piece 126 with respect to other pieces of multilayer material 114, and other suitable parameters.

Figure 13:
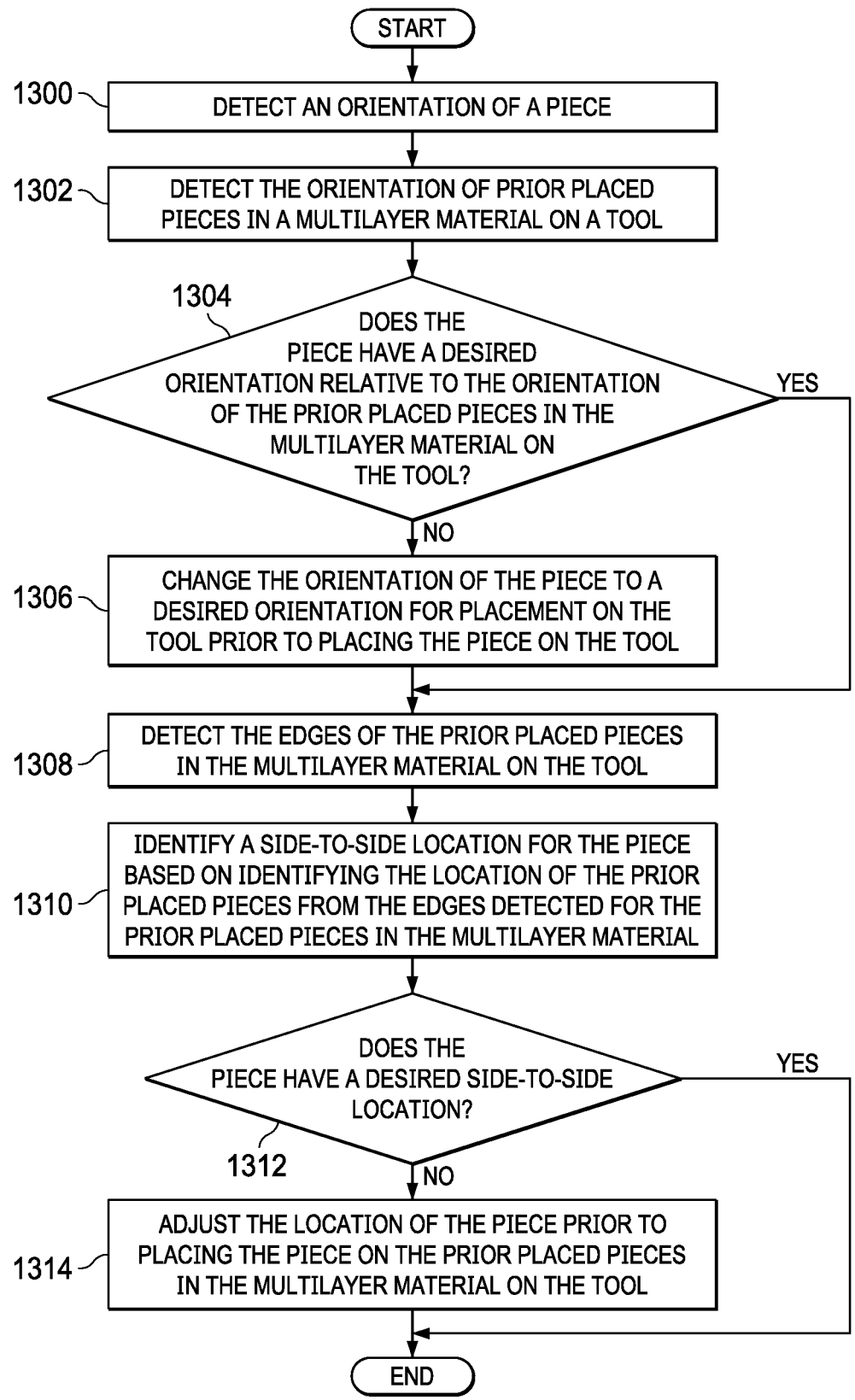
FIG. 13 is an illustration of a flowchart of a process for detecting a placement of a piece of composite materials in accordance with an illustrative embodiment.

With reference now to FIG. 13, an illustration of a flowchart of a process for detecting a placement of a piece of composite materials is depicted in accordance with an illustrative embodiment. The process illustrated in FIG. 13 is an example of one manner in which operation 1208 in FIG. 12 may be implemented.

The process begins by detecting an orientation of piece 126 (operation 1300). The process detects the orientation of pieces in multilayer material 114 on tool 112 (operation 1302). These pieces were placed prior to placement of piece 126.

The process determines whether piece 126 has a desired orientation relative to the orientation of the pieces in multilayer material 114 on tool 112 (operation 1304). If piece 126 does not have the desired orientation, the process changes the orientation of piece 126 to a desired orientation for placement on the tool prior to placing the piece on the tool (operation 1306).

The process detects the edges of the pieces in multilayer material 114 on tool 112 (operation 1308). The process identifies a side-to-side location for piece 126 based on identifying the location of the pieces from the edges detected for the pieces in multilayer material 114 (operation 1310). Thus, in this example, detecting the placement of the pieces in the multilayer material on the tool occurs by detecting at least one of a location of edges of the pieces in the multilayer material on the tool or the placement is an orientation of prior pieces in the multilayer material on the tool.

The process determines whether piece 126 has a desired side-to-side location (operation 1312). If piece 126 does not have a desired side-to-side location, the process adjusts the location of piece 126 prior to placing piece 126 on the pieces in multilayer material 114 on tool 112 (operation 1314). The process terminates thereafter. In this manner, the process controls placing of piece 126 on multilayer material 114 based on detecting the placement of the pieces in multilayer material 114 on tool 112. The process may then continue in operation 1110 to place the piece 126 onto multilayer material 114 on tool 112.

With reference again to operation 1304, if piece 126 has a desired orientation, the process proceeds to operation 1308. Turning back to operation 1312, if piece 126 has a desired side-to-side location, the process terminates.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 14:
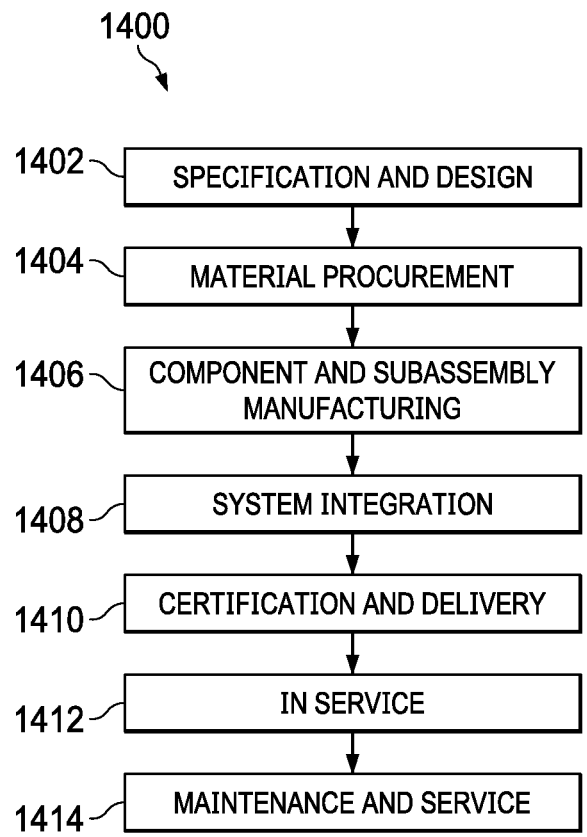
FIG. 14 is an illustration of a block diagram of an aircraft manufacturing and service method in accordance with an illustrative embodiment.
Figure 15:
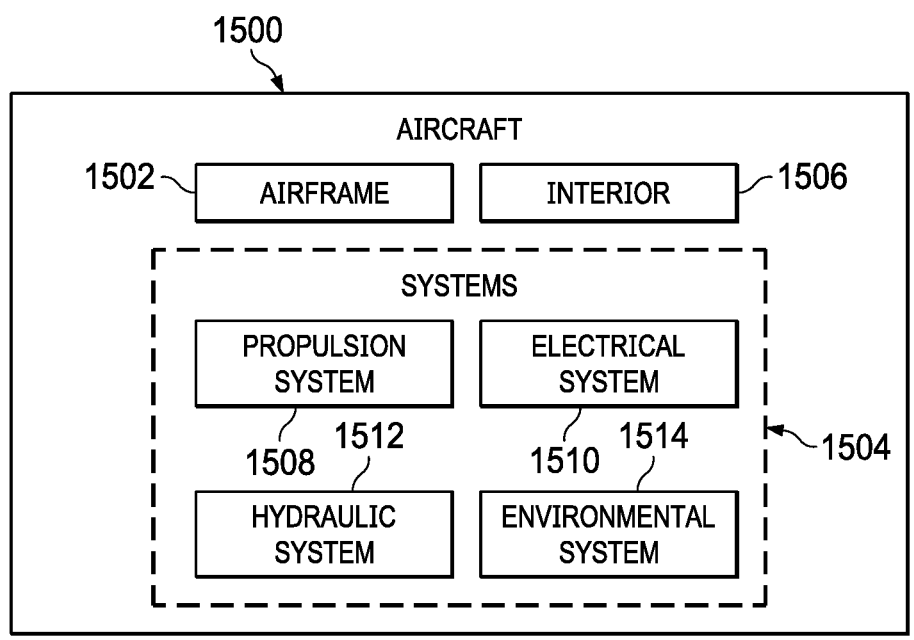
FIG. 15 is an illustration of a block diagram of an aircraft in accordance with an illustrative embodiment.

Illustrative embodiments of the disclosure may be described in the context of aircraft manufacturing and service method 1400 as shown in FIG. 14 and aircraft 1500 as shown in FIG. 15. Turning first to FIG. 14, an illustration of a block diagram of an aircraft manufacturing and service method is depicted in accordance with an illustrative embodiment. During pre-production, aircraft manufacturing and service method 1400 may include specification and design 1402 of aircraft 1500 in FIG. 15 and material procurement 1404.

During production, component and subassembly manufacturing 1406 and system integration 1408 of aircraft 1500 takes place. Thereafter, aircraft 1500 may go through certification and delivery 1410 in order to be placed in service 1412. While in service 1412 by a customer, aircraft 1500 is scheduled for routine maintenance and service 1414, which may include modification, reconfiguration, refurbishment, and other maintenance or service.

Each of the processes of aircraft manufacturing and service method 1400 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 15, an illustration of a block diagram of an aircraft is depicted in accordance with an illustrative embodiment. In this example, aircraft 1500 is produced by aircraft manufacturing and service method 1400 in FIG. 14 and may include airframe 1502 with plurality of systems 1504 and interior 1506. Examples of systems 1504 include one or more of propulsion system 1508, electrical system 1510, hydraulic system 1512, and environmental system 1514. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1400 in FIG. 14. In one illustrative example, components or subassemblies produced in component and subassembly manufacturing 1406 in FIG. 14 may be fabricated or manufactured in a manner similar to components or subassemblies produced while aircraft 1500 is in service 1412 in FIG. 14. As yet another example, one or more apparatus embodiments, method embodiments, or a combination thereof may be utilized during production stages, such as component and subassembly manufacturing 1406 and system integration 1408 in FIG. 14. One or more apparatus embodiments, method embodiments, or a combination thereof may be utilized while aircraft 1500 is in service 1412, during maintenance and service 1414 in FIG. 14, or both.

For example, robot 116 with end effector 118, both as seen in block form in FIG. 1, may be utilized to form multilayer material 114, as seen in block form in FIG. 1, for use in manufacturing composite parts in component and subassembly manufacturing 1406 of FIG. 14. As another example, robot 116 with end effector 118 may be utilized to form multilayer material 114 for use in manufacturing composite parts that are used during maintenance and service 1414 of FIG. 14. The composite parts manufactured using multilayer material 114 that are processed by robot 116 with end effector 118 may be used in at least one of modification, reconfiguration, refurbishment, and other maintenance or service that occurs as part of maintenance and service 1414.

The use of a number of the different illustrative embodiments may substantially expedite the assembly of aircraft 1500, reduce the cost of aircraft 1500, or both expedite the assembly of aircraft 1500 and reduce the cost of aircraft 1500. In the illustrative example, robot 116 with end effector 118 may enable forming multilayer material 114 more quickly and accurately as compared to current techniques for forming multilayer material 114.

Figure 16:
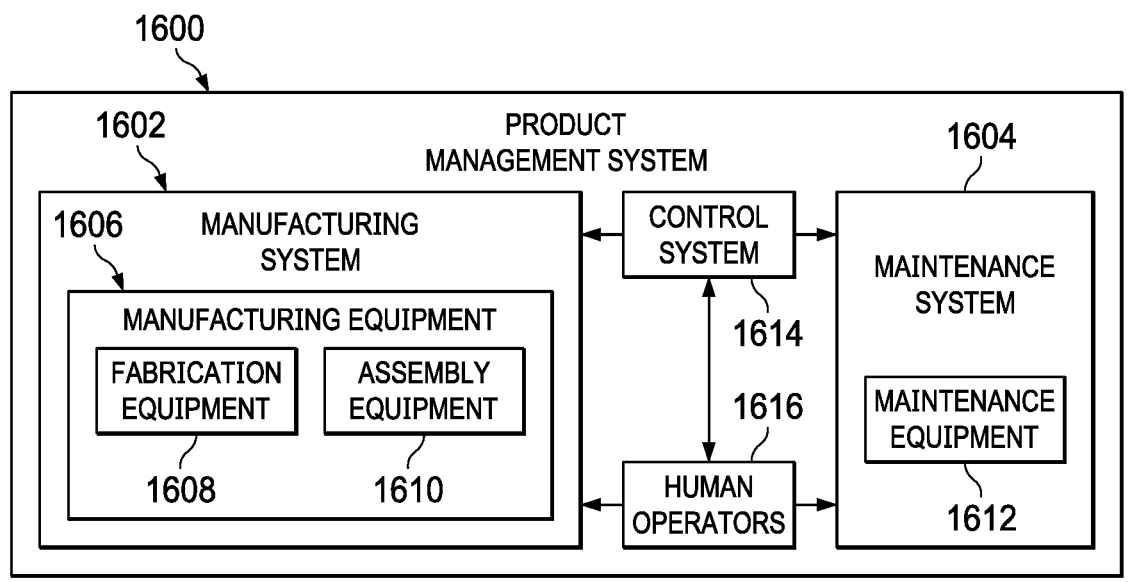
FIG. 16 is an illustration of a block diagram of a product management system in accordance with an illustrative embodiment.

Turning now to FIG. 16, an illustration of a block diagram of a product management system is depicted in accordance with an illustrative embodiment. Product management system 1600 is a physical hardware system. In this illustrative example, product management system 1600 may include at least one of manufacturing system 1602 or maintenance system 1604.

Manufacturing system 1602 is configured to manufacture products, such as aircraft 1500 in FIG. 15. As depicted, manufacturing system 1602 includes manufacturing equipment 1606. Manufacturing equipment 1606 includes at least one of fabrication equipment 1608 or assembly equipment 1610.

Fabrication equipment 1608 is equipment that may be used to fabricate components for parts used to form aircraft 1500. For example, fabrication equipment 1608 may include machines and tools. These machines and tools may be at least one of a drill, a hydraulic press, a furnace, a mold, a composite tape laying machine, a vacuum system, a lathe, or other suitable types of equipment. Fabrication equipment 1608 may be used to fabricate at least one of metal parts, composite parts, semiconductors, circuits, fasteners, ribs, skin panels, spars, antennas, or other suitable types of parts.

For example, fabrication equipment 1608 may include robot 116 in end effector 118 for use in forming multilayer material 114. The use of end effectors such as end effector 118 may reduce the time needed to manufacture composite parts.

Assembly equipment 1610 is equipment used to assemble parts to form aircraft 1500. In particular, assembly equipment 1610 may be used to assemble components and parts to form aircraft 1500. Assembly equipment 1610 also may include machines and tools. These machines and tools may be at least one of a robotic arm, a crawler, a faster installation system, a rail-based drilling system, or a robot. Assembly equipment 1610 may be used to assemble parts such as seats, horizontal stabilizers, wings, engines, engine housings, landing gear systems, and other parts for aircraft 1500.

In this illustrative example, maintenance system 1604 includes maintenance equipment 1612. Maintenance equipment 1612 may include any equipment needed to perform maintenance on aircraft 1500. Maintenance equipment 1612 may include tools for performing different operations on parts on aircraft 1500. These operations may include at least one of disassembling parts, refurbishing parts, inspecting parts, reworking parts, manufacturing replacement parts, or other operations for performing maintenance on aircraft 1500. These operations may be for routine maintenance, inspections, upgrades, refurbishment, or other types of maintenance operations.

In the illustrative example, maintenance equipment 1612 may include ultrasonic inspection devices, x-ray imaging systems, vision systems, drills, crawlers, and other suitable device. In some cases, maintenance equipment 1612 may include fabrication equipment 1608, assembly equipment 1610, or both to produce and assemble parts that may be needed for maintenance.

Product management system 1600 also includes control system 1614. Control system 1614 is a hardware system and may also include software or other types of components. Control system 1614 is configured to control the operation of at least one of manufacturing system 1602 or maintenance system 1604. In particular, control system 1614 may control the operation of at least one of fabrication equipment 1608, assembly equipment 1610, or maintenance equipment 1612.

The hardware in control system 1614 may be using hardware that may include computers, circuits, networks, and other types of equipment. The control may take the form of direct control of manufacturing equipment 1606. For example, robots, computer-controlled machines, and other equipment may be controlled by control system 1614. In other illustrative examples, control system 1614 may manage operations performed by human operators 1616 in manufacturing or performing maintenance on aircraft 1500. For example, control system 1614 may assign tasks, provide instructions, display models, or perform other operations to manage operations performed by human operators 1616.

In the different illustrative examples, human operators 1616 may operate or interact with at least one of manufacturing equipment 1606, maintenance equipment 1612, or control system 1614. This interaction may be performed to manufacture aircraft 1500.

Of course, product management system 1600 may be configured to manage other products other than aircraft 1500. Although product management system 1600 has been described with respect to manufacturing in the aerospace industry, product management system 1600 may be configured to manage products for other industries. For example, product management system 1600 may be configured to manufacture products for the automotive industry as well as any other suitable industries.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described.

For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An end effector comprising:
   flexible flanges;
   a vacuum system that holds a piece of a composite material during operation of the vacuum system against the flexible flanges; and
   a roller system that is moveable to conform to a shape of a tool such that the roller system bends the flexible flanges to substantially conform to the shape of the tool when the roller system moves over the tool in which the roller system enables placing the piece on the tool and compacting the piece on the tool.

2. The end effector of claim 1, wherein a multilayer material is located on the tool, the piece is placed on the multilayer material, and the roller system compacts the piece of the composite material on the multilayer material on the tool when the roller system moves to conform to the shape of the tool.

3. The end effector of claim 1, wherein the vacuum system comprises:
   a vacuum chuck; and
   a vacuum mat removably connected to the vacuum chuck, wherein the vacuum mat has an engagement surface that is configured to contact the piece when a vacuum applied to the vacuum mat through the vacuum chuck holds the piece in contact with the engagement surface of the vacuum mat.

4. The end effector of claim 3, wherein the vacuum mat comprises:
   a planar structure having the engagement surface;
   a vacuum interface that is connectable to the vacuum chuck;
   a channel system within the planar structure that forms a vacuum path; and
   vacuum holes in the engagement surface that are in communication with the channel system.

5. The end effector of claim 3 further comprising:
   a planar structure connected to the vacuum chuck, wherein the flexible flanges are part of the planar structure.

6. The end effector of claim 3, wherein the flexible flanges are part of the vacuum chuck.

7. The end effector of claim 1, wherein the roller system comprises:
   rollers; and
   a movement system configured to move the rollers to conform to the shape of the tool such that the rollers bend the flexible flanges to substantially conform to the shape of the tool when the roller moves over the tool.

8. The end effector of claim 7, wherein the movement system comprises:
   a shaft;
   a linkage system connected to the rollers; and
   an air cylinder connected to the linkage system and the shaft, wherein the air cylinder moves in a linear direction along the shaft causing the rollers to move over the tool.

9. The end effector of claim 7, wherein a roller in the rollers comprises one of a cylinder, an array of cylinders, a tapered cylinder, a convex radius cylinder, a concave radius cylinder, and a stack of polymer washers.

10. The end effector of claim 1, wherein the tool is selected from a group comprising a mandrel and a mold.

11. The end effector of claim 2, wherein the multilayer material is selected from one of a tape, a graphite tape, glass fiber tape, a fabric, or a prepreg.

12. The end effector of claim 1, wherein a controller controls movement of the end effector to pick up the piece of the composite material from a source of the composite material; move the piece on a path to the tool using the end effector; and place the piece on the tool such that the piece conforms to a shape of the tool using the end effector.

13. The end effector of claim 1, wherein a controller controls movement of the end effector to pick up the piece of the composite material from a source of the composite material; move the piece on a path to the tool using the end effector; and place the piece on the tool such that the piece conforms to the shape of the tool using the end effector and using a sensor system, wherein the sensor system forms a feedback loop providing sensor data that is used by the controller to control the movement of the end effector.

14. A method for placing a piece of a composite material, the method comprising:
   picking up the piece of the composite material from a source using an end effector, wherein the end effector comprises flexible flanges;
   moving the piece to a tool using the end effector applying a vacuum to the piece to hold the piece to against the flexible flanges;
   placing the piece on the tool using the end effector; and
   conforming the piece to a shape of the tool using a roller system that is moveable to conform to the shape of a tool such that the roller system bends the flexible flanges to substantially conform to the shape of the tool when the roller system moves over the tool in which the roller system enables placing the piece on the tool and compacting the piece on the tool.

15. The method of claim 14, wherein the roller system comprises a roller comprising a flexible material.

16. The method of claim 14 wherein the tool comprises a mandrel and wherein compacting the piece on the tool causes tape to adhere to the mandrel.

17. The method of claim 14 further comprising:
   detecting an orientation of the piece; and
   changing the orientation of the piece to a desired orientation for placement on the tool prior to placing the piece on the tool.

18. The method of claim 14 further comprising:
   detecting a placement of pieces in a multilayer material on the tool, wherein the piece is one of the pieces; and
   controlling placing of the piece on the multilayer material based on detecting the placement of the pieces in the multilayer material on the tool.

19. The method of claim 18, wherein detecting the placement of the pieces in the multilayer material on the tool comprises:
   detecting the placement of the pieces in the multilayer material on the tool by detecting at least one of a location of edges of the pieces in the multilayer material on the tool or the placement is an orientation of prior pieces in the multilayer material on the tool.

20. The method of claim 14 further comprising:
holding the piece of the composite material using the vacuum.

21. The method of claim 20, wherein the vacuum is applied using a vacuum system comprising a vacuum chuck and a vacuum mat removably connected to the vacuum chuck, wherein the vacuum mat has an engagement surface that is configured to contact a multilayer material and the vacuum applied to the vacuum mat through the vacuum chuck holds the piece in contact with the engagement surface of the vacuum mat.

22. The method of claim 21, wherein the vacuum mat comprises a planar structure having the engagement surface; a vacuum interface that is connectable to the vacuum chuck; a channel system within the planar structure that forms a vacuum path; and vacuum holes in the engagement surface that are in communication with the channel system.

23. The method of claim 21, wherein a planar structure is connected to the vacuum chuck, wherein the flexible flanges are part of the vacuum mat.

24. The method of claim 21, wherein the flexible flanges are part of the vacuum chuck.

25. The method of claim 14, wherein the roller system comprises a plurality of rollers and a movement system configured to move the rollers to conform to the shape of the tool such that the plurality of rollers bends the flexible flanges to substantially conform to the shape of the tool when the plurality of rollers moves over the tool.

26. The method of claim 25 further comprising:
moving an air cylinder in a linear direction along a shaft of the movement system causing the plurality of rollers to move over the tool, wherein the air cylinder is connected to the plurality of rollers.

27. The method of claim 25, wherein a roller in the plurality of rollers comprises one of a cylinder, an array of cylinders, a tapered cylinder, a convex radius cylinder, a concave radius cylinder, and a stack of polymer washers.

28. The method of claim 14, wherein the tool is selected from the group consisting of a mandrel and a mold.

29. The method of claim 18, wherein the multilayer material is selected from one of a tape, a graphite tape, glass fiber tape, a fabric, or a prepreg.

30. An end effector for placing a piece of a composite material, the end effector comprising:
a shaft;
a channel extending through the shaft;
a roller system comprising a first roller and a second roller connected to a first linkage and a second linkage and an air cylinder; in which the air cylinder is moveably connected to the shaft; in which the first linkage and the second linkage are connected to the air cylinder and are moveable by the air cylinder along the shaft; in which a gap is present between the first roller and the second roller; and in which the gap is adjustable to receive a tool when the first roller and the second roller engage the tool; and
a vacuum system comprising a vacuum chuck connected to an end of the shaft and a vacuum mat connected to the vacuum chuck, in which the vacuum mat is flexible, connected to the vacuum chuck, and has an engagement surface with vacuum holes in the engagement surface that are in communication with the channel in the shaft through the vacuum chuck and in which the vacuum mat is flexible and bends to conform to a shape of the tool when the engagement surface holding the piece of the composite material engages the tool, and the first roller and the second roller engage the vacuum mat and the tool.

31. The end effector of claim 30, wherein the vacuum mat comprises:
a planar structure having the engagement surface;
a vacuum interface that is connectable to the vacuum chuck;
a channel system within the planar structure that forms a vacuum path; and
the vacuum holes in the engagement surface that are in communication with the channel system.

32. The end effector of claim 30, wherein a controller controls movement of the end effector to pick up the piece of the composite material from a source of the composite material; move the piece on a path to the tool using the end effector; and place the piece on the tool such that the piece conforms to the shape of the tool using the end effector.

* * * * *